US008531062B1

(12) United States Patent
Eghbal et al.

(10) Patent No.: US 8,531,062 B1
(45) Date of Patent: Sep. 10, 2013

(54) LINEAR MOTOR WITH THREE MAGNETS AND A COIL CARRIER HAVING MULTIPLE WINDING AREAS WITH EACH AREA HAVING A SECTION OF A COIL WOUND WITH ONE CONTINUOUS WIRE, OR SEPARATE COILS RESPECTIVELY WOUND AROUND EACH AREA WITH ALL COILS WOUND IN THE SAME DIRECTION

(75) Inventors: Fariborz Aaron Eghbal, Beverly Hills, CA (US); Joseph Benjamin Hanukaai, Woodland Hills, CA (US); Vahid David Hannani, Los Angeles, CA (US)

(73) Assignee: Moticont, Van Nuys, CA (US)

( * ) Notice: Subject to any disclaimer, the term of this patent is extended or adjusted under 35 U.S.C. 154(b) by 166 days.

(21) Appl. No.: 13/135,009

(22) Filed: Jun. 23, 2011

Related U.S. Application Data

(60) Provisional application No. 61/398,698, filed on Jun. 29, 2010.

(51) Int. Cl.
*H02K 41/03* (2006.01)
*H01F 7/08* (2006.01)
*H04R 9/04* (2006.01)

(52) U.S. Cl.
USPC ........... 310/12.16; 310/15; 335/222; 381/407

(58) Field of Classification Search
USPC ......... 310/12.01, 12.16, 13, 14, 15; 335/222, 335/229, 230, 232, 234, 266; 381/400
IPC ....................................................... H02K 33/18
See application file for complete search history.

(56) References Cited

U.S. PATENT DOCUMENTS

| 3,202,886 | A | * | 8/1965 | Kramer | 335/234 |
| 5,345,206 | A | | 9/1994 | Morcos | |
| 5,745,019 | A | * | 4/1998 | Renger | 335/222 |
| 6,157,100 | A | * | 12/2000 | Mielke | 310/13 |
| 7,517,721 | B2 | * | 4/2009 | Ito et al. | 438/106 |

* cited by examiner

*Primary Examiner* — Tran Nguyen
*Assistant Examiner* — Thomas Truong
(74) *Attorney, Agent, or Firm* — Thomas I. Rozsa

(57) ABSTRACT

A linear motor includes an assembly of three magnets in series coaxially affixed inside of a housing, which results in an air gap therebetween, wherein the assembly includes a middle magnet whose direction of magnetization is opposite to that of the rest of the magnets. A first embodiment of the motor includes a coil carrier having a single electrical coil of two sections wound in the same direction and positioned into the corresponding two winding areas. The carrier is movably positioned into the air gap and further surrounds the assembly, thereby moving along an axial direction of the motor. A second embodiment includes two coils that are wound in a same direction with the respective separated wires and positioned into the respective two winding areas of the coil carrier.

24 Claims, 5 Drawing Sheets

LINEAR MOTOR WITH THREE MAGNETS AND A COIL CARRIER HAVING MULTIPLE WINDING AREAS WITH EACH AREA HAVING A SECTION OF A COIL WOUND WITH ONE CONTINUOUS WIRE, OR SEPARATE COILS RESPECTIVELY WOUND AROUND EACH AREA WITH ALL COILS WOUND IN THE SAME DIRECTION

CROSS-REFERENCE TO RELATED APPLICATIONS

This application claims priority from U.S. Provisional patent application Ser. No. 61/398,698 filed on Jun. 29, 2010.

BACKGROUND OF THE INVENTION

1. Field of the Invention

The present invention relates to the field of linear motors which include a coil surrounding a magnet assembly.

2. Description of the Prior Art

U.S. Pat. No. 5,345,206 issued to Anthony C. Morcos on Sep. 6, 1994 and assigned to BEI Electronics, Inc. discloses a cylindrically-symmetrical moving coil linear actuator.

The actuator utilizes axially-magnetized cylindrical magnets to provide flux-focused interleaved magnetic circuits. The actuator includes a cylindrical shell that has a closed end and an open end. A magnetic core is disposed within the shell to define an annular air gap between the shell and the core. The core includes a first set of axially-magnetized cylindrical permanent magnets having a first direction of magnetization and disposed adjacent the closed end of the shell. A second set of permanent magnets has a second direction of magnetization which is opposite to the first direction of magnetization and is disposed adjacent the open end of the shell.

A moving coil assembly is disposed with the annular air gap. The coil assembly includes a non-magnetic coil carrier. A first coil winding is formed on the coil carrier in proximity to a first set of magnets and is wound to have a first polarity. A second coil winding is formed on the coil carrier in proximity to a second set of magnets and is wound to have a second polarity opposite to the first polarity such that the first and second coil windings are wound in opposite directions.

The invention disclosed in U.S. Pat. No. 5,345,206 can be improved upon. Specifically, it is not necessary for the first and second coil windings which are wound to have the opposite polarities as disclosed in the invention.

There is a significant need to provide a linear motor that will simplify the motor structure and reduce cost in manufacturing, while maintaining the same functionality of the motor.

SUMMARY OF THE INVENTION

A first embodiment of the present invention linear motor includes an assembly of magnets coaxially affixed inside of a housing, an air gap situated between the magnets and the housing so that a coil carrier having a single electrical coil of two sections wound in a same direction is movably positioned within the air gap and also surrounds the assembly of magnets. The coil carrier moves along an axial direction of the motor when the coil carrier is driven by forces resulting from an interaction of the magnets and the single electrical coil after it is supplied with electricity. The single electrical coil preferably includes an even number of multiple layers of coil windings, wherein each layer of the coil winding is comprised of first and second sections that are separated by a central barrier positioned within the coil carrier. The assembly includes proximal, middle and distal magnets affixed in series, wherein a direction of magnetization of the middle magnet is opposite to the direction of magnetization of the proximal and distal magnets.

The housing is formed in the shape of a cylindrical container including an opened proximal end, a closed distal end, and a cylindrical wall between the proximal and distal ends.

The assembly of magnets is also in a cylindrical shape and preferably has three permanent magnets: distal, middle and proximal magnets affixed in series. The distal permanent magnet has a direction of magnetization which is coaxially connected to a distal pole piece, wherein the distal pole piece has the shape of a cylindrical disk and is made of a ferromagnetic material. The distal pole piece is coaxially connected to a middle permanent magnet having a direction of magnetization that is opposite to the direction of magnetization of the distal magnet. The middle magnet is coaxially attached to a middle pole piece made of the ferromagnetic material. The middle pole piece again is coaxially connected to a proximal magnet having a direction of magnetization which is the same as that of the distal magnet, wherein the proximal magnet is further connected to a proximal pole piece made of the ferromagnetic material.

The coil carrier is formed in the shape of a cylindrical container which is made of non-magnetic material. The carrier is comprised of a proximal end having an exterior transverse surface and central opening, an open distal end, and a cylindrical wall that surrounds an interior cylindrical opening, wherein the central opening of the proximal end is connected to the interior cylindrical opening.

A transverse circular notch is positioned at the proximal end of the carrier to thereby form a proximal circular barrier having an interior transverse ring surface and a first groove crossing the barrier. At a middle of the cylindrical wall of the carrier, there is a circular protrusion which serves as a central barrier to include first and second transverse ring surfaces, and a second groove that is aligned with the axial orientation of the carrier. At the distal end of the carrier there is positioned a distal transverse flange, which serves as a distal barrier. Therefore, the proximal barrier and central barrier form a first winding area for winding a first section of the single electrical coil. The central barrier and distal barrier form a second winding area for winding a second section of the coil.

For winding the single electrical coil, the coil winding starts with a first layer of coil wound on the coil carrier that also serves as a supporter and locking device for the coil. In the winding process, a first end of a wire is positioned inside of the notch, and then bent at a 90 degree angle to pass through the first groove of the proximal barrier. The wire is then bent into another 90 degree angle to again contact the interior transverse ring surface of the proximal barrier for winding the coil in a given direction which can be either clockwise or counter-clockwise.

A first coil layer winding is completed when the coil is wound in one direction such as the clockwise direction, going from the interior transverse ring surface of the proximal barrier until it reaches the first transverse ring surface of the central barrier. When the wire comes into contact with the first transverse ring surface of the central barrier, the wire is bent to pass through a second groove in the central barrier, and then bent another 90 degrees to contact the second transverse ring surface of the central barrier, so that the coil continues to be wound in the same clockwise direction and longitudinal direction towards the distal barrier.

When the wire comes into contact with the interior transverse ring surface of the distal barrier, the first layer of winding is completed. A second layer is wound in the same clockwise direction but travels in the opposite axial direction as compared with the first winding layer.

When the second winding layer encounters the second transverse ring surface of the central barrier, it is bent to extend through the groove and the winding continues from the first transverse ring surface of the central barrier to the interior transverse surface of the proximal barrier. The second layer of winding is positioned above the first layer of winding. Multiple successive layers are wound in the same manner.

The advantages of the single electrical coil from the first embodiment of the present invention are (1) a single wire is used to form the coil, which eliminates a necessary wire connection between first and second coil windings; (2) the first and second ends of the single electrical coil of the present invention are both positioned at the proximal end of the coil carrier which makes it easier to manufacture; (3) the single coil having the even numbered layers of the coil windings causes a reduction of the width of the air gap which significantly increases the amount of force the motor can supply; and (4) the single coil has a uniform polarity when is supplied with electricity.

A second embodiment of the present invention linear motor is similar to the first embodiment, except for having first and second coils that are positioned in the corresponding first and second winding areas and wound in the same direction with the respective separated first and second wires. Therefore, for positioning two sections of the second wire that are connected to the respective first and second ends of the second coil, the second embodiment has a wider air gap as compared with that of the first embodiment.

Variations of the respective embodiments result in a single electrical coil having multiple sections of the coil windings wound in the same direction, or multiple coils wound in the same direction according to multiple winding areas of the coil carrier for the present invention linear motor.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
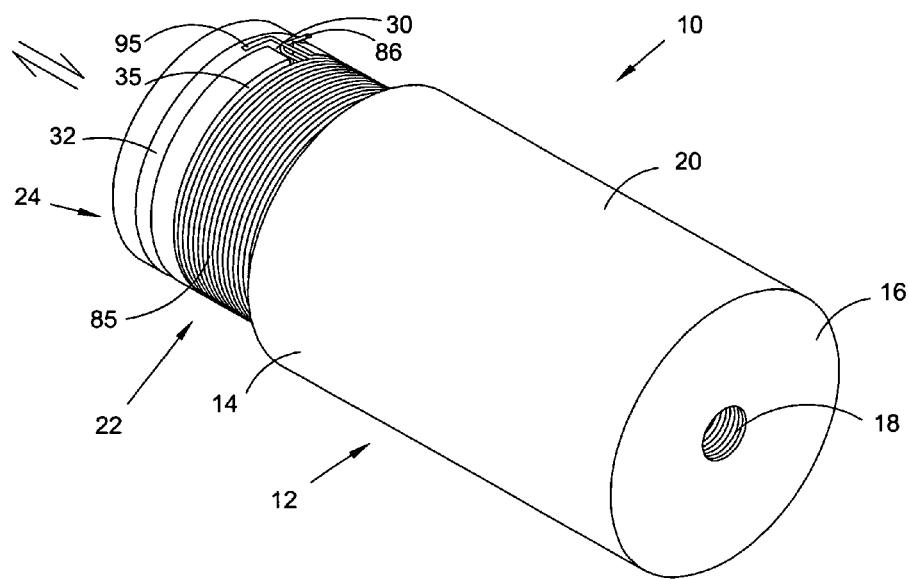
FIG. 1 is a perspective view of a linear motor from a first embodiment of the present invention, illustrating a movable coil carrier which is moved forwardly away from a housing of the motor along an axial direction of the motor.

Referring to FIG. 1, there is illustrated first embodiment 10 of the present invention linear motor in a preferred cylindrical shape. The figure particularly illustrates that a movable coil carrier 24 of the motor moves forward along an axial direction of the motor and relative to a housing 12 of the motor. In addition, the figure also shows the coil carrier has a single electrical coil 22.

Figure 2A:
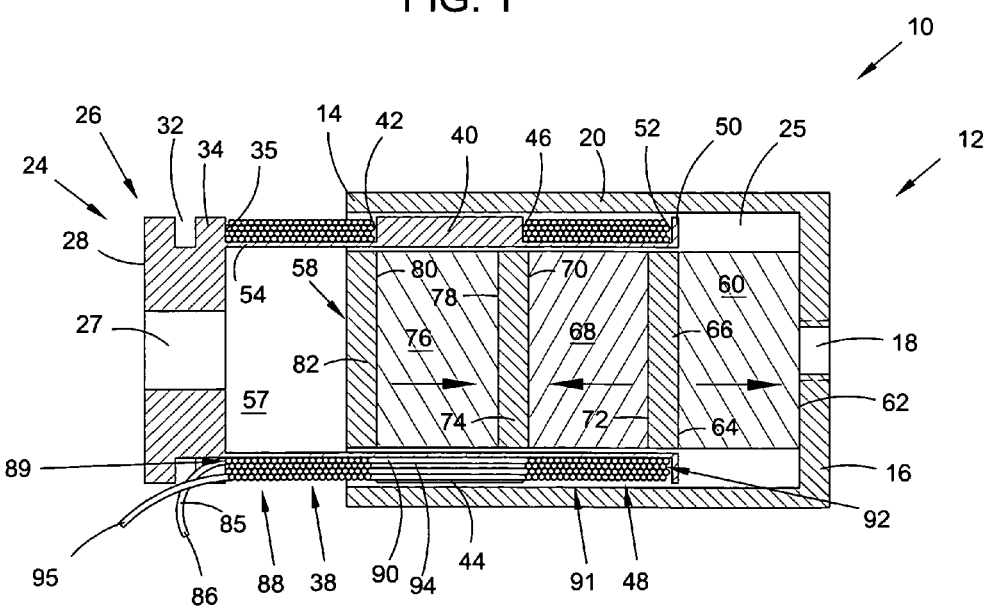
FIG. 2A is a longitudinal cross-section view of the linear motor shown in FIG. 1.

As further illustrated in FIG. 2A, the linear motor 10 includes the movable coil carrier 24 and an interior assembly 58 of magnets that is affixed inside of the exterior housing 12. The housing has a shape of a cylindrical container, and is made of a ferromagnetic material. The housing is comprised of an open proximal end 14, a closed distal end 16 that may include a central threaded opening 18, and a cylindrical wall 20 between the proximal and distal ends.

The magnet assembly 58 is also in a cylindrical shape and preferably has three permanent magnets: distal, middle and proximal magnets affixed in series. The distal permanent magnet 60 has first and second magnetic poles 62 and 64, which second magnetic pole 64 is coaxially connected to a distal pole piece 66 that is in the shape of a cylindrical disk and made of a ferromagnetic material. The distal pole piece 66 is coaxially connected to a middle permanent magnet 68 having third and fourth magnetic poles 70 and 72. The middle magnet at its third pole 70 is coaxially attached to a middle pole piece 74 made of the ferromagnetic material. The middle pole piece again is coaxially connected to a proximal magnet 76 having fifth and sixth magnetic poles 78 and 80, wherein the proximal magnet at the sixth magnetic pole 80 is connected to a proximal pole piece 82 made of ferromagnetic material.

Referring to FIG. 2A, there is illustrated that the first and second poles 62 and 64 determine a direction of the magnetic field or magnetization of the distal magnet 60. Similarly, the fifth and sixth poles 78 and 80 determine the direction of magnetization of the proximal magnet 76. The distal and proximal magnets have the same direction of magnetization. However, a direction of the magnetic field of the middle magnet 68 is opposite to the direction of the magnetization of the respective distal and proximal magnets. The third and fourth poles 70 and 72 determine the direction of magnetization 68 of the middle permanent magnet which is the direction opposite to the distal and proximal magnets. It will be appreciated that with this design of the magnet assembly, the linear motor 10 will output strong axial forces when its coil is supplied with direct electric current.

Figure 2B:
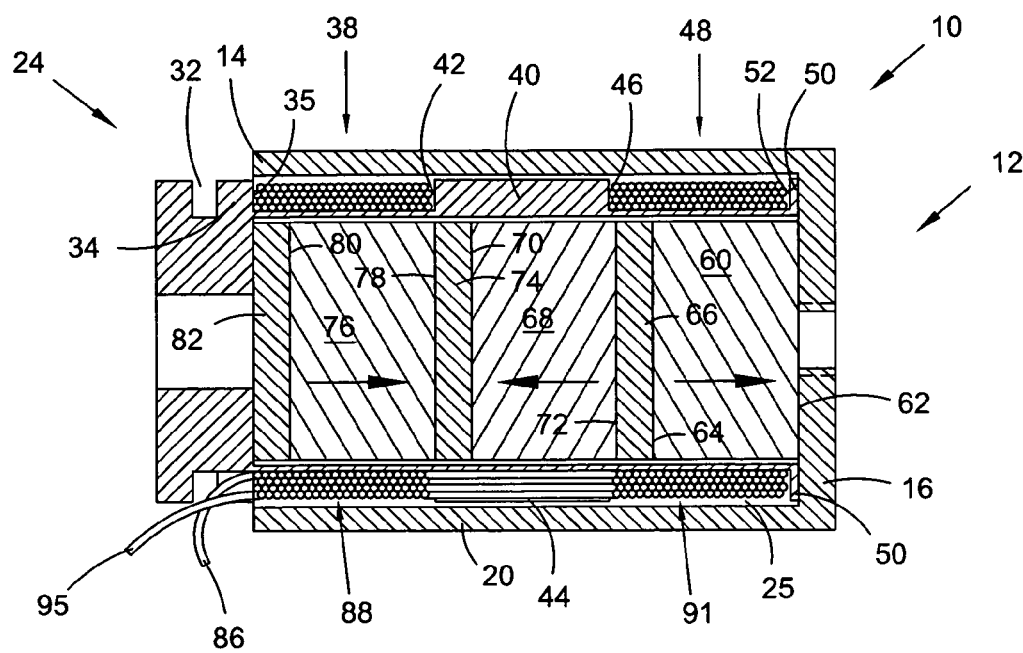
FIG. 2B is a longitudinal cross-section view of the linear motor from the first embodiment of the present invention, which illustrates the movable coil carrier when it is moved backward to a position inside of the housing.

As further illustrated in FIGS. 1 and 2B, the assembly of the magnets is coaxially affixed inside of the housing, wherein the proximal pole piece 82 is aligned with the opened proximal end 14 of the housing, and the distal magnet 60 is connected to a center of an interior surface of the closed distal end 16 of the housing. It will be appreciated that the distal magnet 60 can be affixed to the distal end of the housing by adhesive, or it can be mechanically affixed by application of fasteners such as a screw. Affixed in this way, a circular air gap 25 is formed between the wall 20 of the housing and assembly 58 to thereby provide room for the movable coil carrier 24, which is movably positioned to surround the magnet assembly 58 in a back and forth axial movement along the axial direction of the motor 10.

Figure 3A:
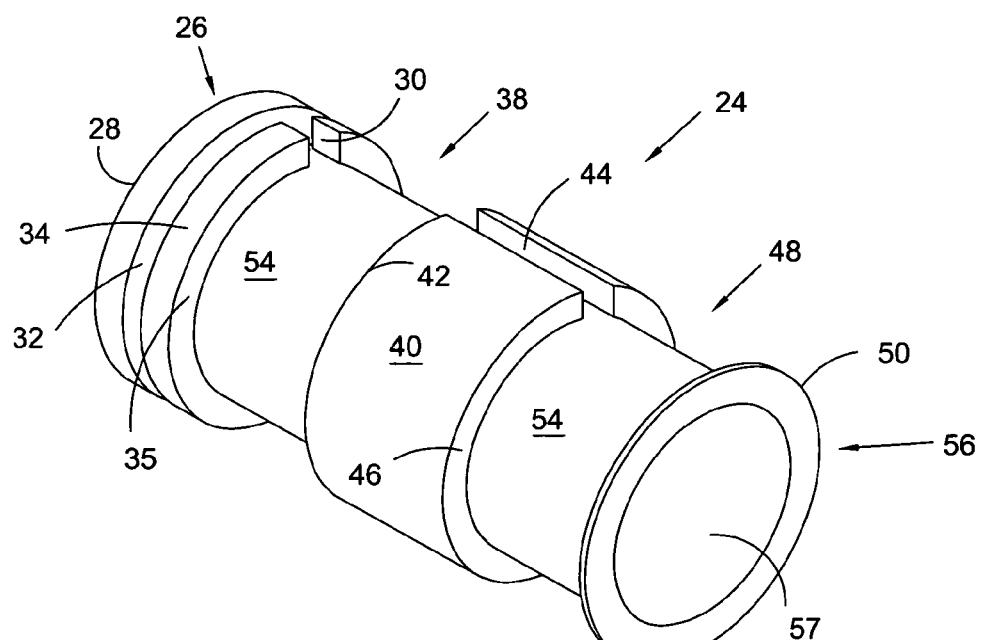
FIG. 3A is a perspective view of the coil carrier for the linear motor from the first embodiment of the present invention.
Figure 3B:
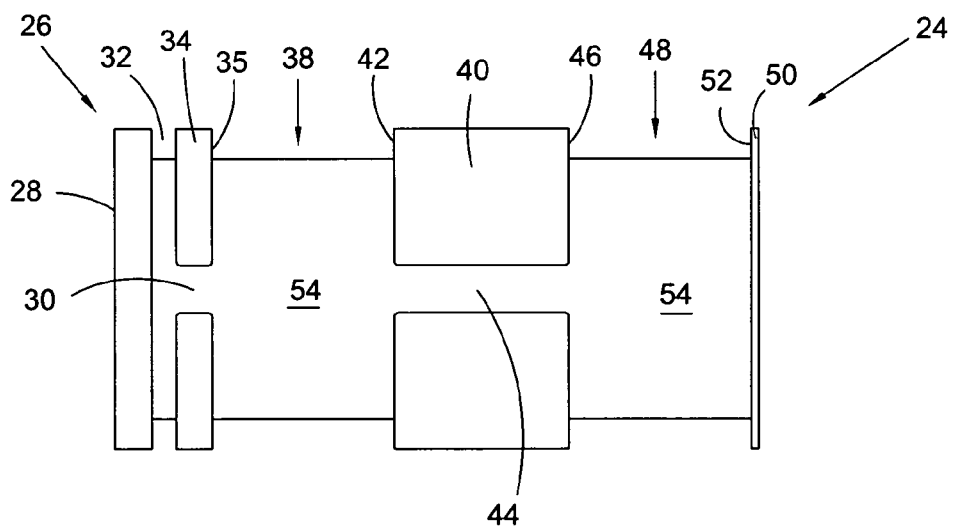
FIG. 3B is a front view of the coil carrier illustrated in FIG. 3A.

Referring to FIGS. 2A, 3A and 3B, the coil carrier 24 or bobbin is illustrated to have a shape of a cylindrical container, which is made of a non-magnetic material. The carrier 24 is comprised of a proximal end 26 having an exterior transverse surface 28 and central opening 27, an opened distal end 56, and a cylindrical wall 54 that surrounds an interior cylindrical opening 57, wherein the central opening 27 is connected to the interior cylindrical opening 57.

As further illustrated, a transverse circular notch 32 is positioned at the proximal end 26. This forms a proximal circular barrier 34, which has an interior transverse ring surface 35 and a first groove 30 crossing the barrier.

A circular protrusion which serves as a central barrier 40 is positioned at a middle of the cylindrical wall 54 of the carrier. The central barrier 40 has a width which is significantly wider than that of the proximal barrier 34. The central barrier is illustrated to include first and second transverse ring surfaces 42 and 46, and a second groove 44 that is aligned with the axial orientation of the carrier. In addition, a distal transverse flange 50 is positioned at the distal end 56 of the coil carrier, which serves as a distal barrier.

Referring to FIGS. 2A, 2B, 3A and 3B again, the proximal barrier 34 and central barrier 40 are illustrated to form a first winding area 38 for winding a first section 88 of the single coil of the present invention. The central barrier 40 and distal flange 50 form a second winding area 48 for winding a second section 91 of the single coil.

In addition, as illustrated in FIG. 2B, the first winding area 38 has a width which is equal to a width of the proximal permanent magnet 76 that is combined with a width of the proximal pole piece 82. Similarly, the second winding area 48 has a width which is equal to a width of the distal permanent magnet 60 that is combined with a width of the distal pole piece 66. It will be appreciated that according to a preferred embodiment of the coil carrier, the first winding area has a width which is the same as that of the second winding area.

When winding the single electrical coil of the present invention, one can start to wind a first layer of the coil around the coil carrier which also serves as a supporter and locking device for the single electrical coil. In a process of winding the electrical coil, for example, as illustrated in FIG. 1, a first end 86 of a wire 85 is positioned inside of the notch 32, and then bent at a 90 degree angle to pass through the first groove 30 of the proximal barrier 34. It will be appreciated that the wire is then bent another 90 degrees to again contact the interior transverse ring surface 35 of the proximal barrier for winding the coil following a given direction such as clockwise. In this setting the first groove 30 serves as a locking device which locks the first end 86 of the wire so that it can tightly wind a first layer 89 of the single electrical coil in the first section 88.

The first layer 89 of the first section 88 of the single electrical coil is wound by continuing to wind the coil in the clockwise direction and a longitudinal direction towards the first transverse ring surface 42 of the central barrier. When the wire comes into contact with the surface 42, the wire is first bent to pass through the second groove 44 of the central barrier 40, and then bent at another 90 degree angle to contact the second transverse ring surface 46 of the central barrier. In this setting, the second groove 44 serves as a room for positioning a section 90 of the wire illustrated in FIG. 2A, and a locking device so that a first layer 89 of the single coil in the second section 91 can be tightly wound, wherein the coil winding is simultaneously wound in the same clockwise direction and longitudinal direction towards the distal flange 50.

When the wire comes into contact with the interior transverse ring surface 52 of the distal flange, it completes the winding of the first layer 89 of the single electrical coil in the second section 91. Then, a second layer 92 of winding in the second section 91 is positioned above the first layer and further positioned to contact the first layer 89 of the single electrical coil. Following the same clockwise direction and a direction towards the central barrier 40, winding of the second layer 92 of the single coil in the second section 91 is completed when the wire comes into contact with the second transverse ring surface 46. The wire is then bent to pass through the second groove 44, wherein a section 94 of the wire is illustrated in FIG. 2A to be positioned inside of the second groove. The wire is further bent to enter into a first winding area 38 for winding a second layer 92 of the single coil in the first section 88 in a similar fashion as the winding of the second layer in the second section. It will be appreciated that the coil windings of the respective first and second layers have the same electromagnetic polarity when supplied with electricity since the first and second layers of the coil windings are wound in the same clockwise direction.

The single electrical coil is completely wound when an even number of multiple layers of the coil windings in the first and second sections are completed in accordance with a required number of coil windings for a given linear motor. Therefore, a second end 95 of the wire is bent to pass through the first groove 30, and further bent to be positioned inside of the notch 32, which is illustrated in FIG. 1. In this situation, the second end 95 of the wire is positioned above the first end 86 of the wire.

It will be appreciated that the single electrical coil can also be wound in a counterclockwise direction.

The advantages of the single electrical coil of the present invention linear motor include that a single continuous wire is used to form the coil having two sections, which eliminates a necessary internal wire for routing the wires from the second coil winding over the first coil winding and into termination area 32 to then be connected to the wires from the first coil winding. This is advantageous since by eliminating the internal connecting wire having a defined diameter that occupies a corresponding air space facilitating a reduced width of the circular air gap 25 of the present invention, which results in increase of forces of the linear motor.

In addition, the first and second ends 86 and 95 of the single electrical coil of the present invention are both positioned at the proximal end of the coil carrier, which is also easier to manufacture. Furthermore, the present invention single coil has uniform polarity when is supplied with electricity, as compared with two opposite polarities from the existing technologies.

Referring to FIG. 2B, there is illustrated longitudinal cross-section of the present invention linear motor 10, wherein the coil carrier completes a backward movement so that the distal barrier 50 of the carrier is positioned adjacent the distal end 16 of the housing.

It will be appreciated that the forward and backward moving abilities of the coil carrier 24, which are illustrated in the respective FIGS. 1, 2A and 2B, are relative to the housing 12 that is assumed to be in a stationary condition. For example, the housing is affixed to a substrate that is stationary. Therefore, the movable coil carrier in its forward and backward movement will provide the respective forward and backward forces to an object, for example which is connected to the head of the carrier, so that the object is then driven to have the corresponding forward and backward movement, as compared with the movement of the present invention linear motor. Alternatively, the coil carrier 24 can be set at a stationary condition, so that the housing 12 can have a forward or a backward movement relative to the coil carrier. In this situation, the movable housing will provide forces to an object that is connected to the housing of the present invention linear motor.

The theory of how the motor works is as follows:

When a wire carrying current is placed in a magnetic field, a force will act upon it. The magnitude of this force is a function of magnetic flux density, the current and the orientation between the two.

In the case of a traditional single permanent magnet/coil pair wherein a pole piece is connected to the magnet, a magnetic flux of the permanent magnet is directed by the pole piece to cross a small air gap between the edge of the pole piece and wall of a housing of the motor.

The electrical current within the portion of the coil that crosses this magnetic flux generates a force in the axial direction of the motor. By reversing the direction of the current or the direction of the magnetic field, the force will be reversed.

Figure 2C:
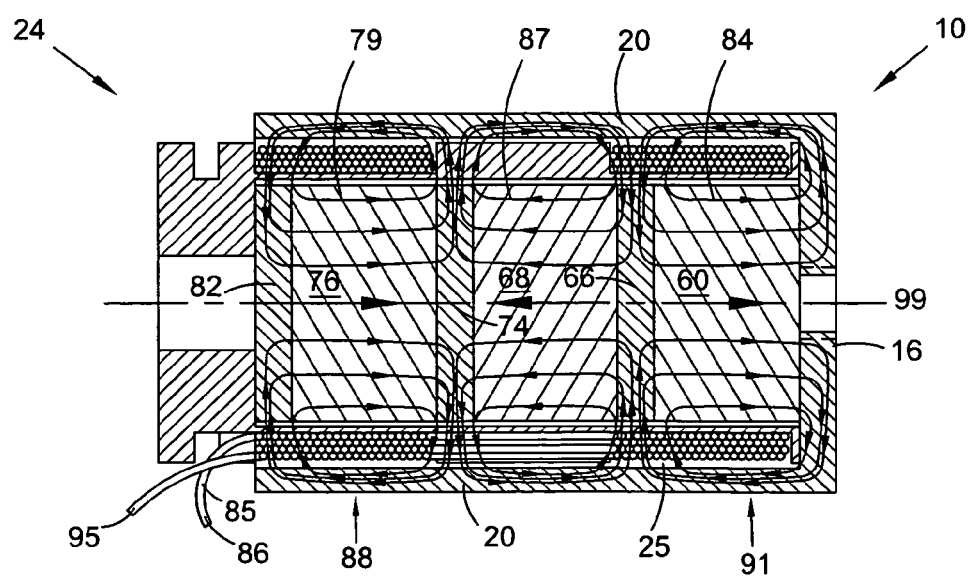
FIG. 2C is a longitudinal cross-sectional view of the linear motor, which illustrates the magnetic flux paths of the motor when the linear motor is in the position illustrated in FIG. 2B.

In the case of the present invention linear motor, a first arrangement of the distal magnet 60, distal pole piece 66 and second section 91 of the single coil creates the above illustrated force according to a magnetic flux 84 illustrated in FIG. 2C, which is determined by the magnetic poles 62 and 64. As illustrated, the magnetic flux 84 of the first arrangement is symmetric relative to a symmetric axis 99 of the motor. The flux 84 completes a loop consisting of the distal magnet 60, the distal end 16 and wall 20 of the housing, the air gap 25 whose majority is occupied by the second section 91 of the single coil and the distal pole piece 66.

In addition, a second arrangement of the proximal magnet 76, proximal pole piece 82 and first section 88 of the single coil has the same function as that of the first arrangement. The current that passes through the first section 88 of the single coil crosses the magnetic flux 79 which in turn creates an axial force, wherein the flux 79 completes a loop consisting of the proximal magnet 76, middle pole piece 74, air gap 25 whose majority is occupied by the central barrier 40 of the coil carrier, wall 20 of the housing, air gap 25 whose majority is occupied by the first section 88 of the coil, and proximal pole piece 82.

Since in the first and second arrangements the current flows in the same direction and the magnetic flux that crosses the respective first and second sections 88 and 91 of the single coil have the same direction, the above illustrated two forces will also be in the same direction, therefore they add up. However, it also brings a possibility of a small axial leakage of the magnetic flux between the distal and proximal magnets 60 and 76, wherein the possible leakage of the magnetic flux could reduce the flux density crossing the respective first and second sections of the single coil to thereby reduce forces of the motor.

Therefore, it is advantageous for the present invention to add the middle magnet 68, since the middle magnet minimizes an effect of the axial leakage between the distal and proximal magnets due to its opposing magnetic flux 87 as compared with the respective flux 84 and 79. Additionally it will add flux to the flux of the magnet assembly, as illustrated that a direction of the magnetic flux of the middle magnet 68 in the middle pole piece 74 is consistent with that of the proximal magnet 76 in the same pole piece. Similarly, a direction of the magnetic flux of the middle magnet 68 in the distal pole piece 66 is consistent with that of the distal magnet 60 in the same pole piece. Accordingly, it increases forces of the present invention linear motor having the assembly of three magnets.

As compared with the above illustrated single coil having the even numbered layers of the coil windings, the single coil can also be wound to have an odd number of multiple layers of the coil windings. For example, referring to FIG. 2A, an odd numbered layer of the coil windings end adjacent to the distal end 50 of the coil carrier, the end of the wire is positioned inside of the notch 32, after a section of the wire is pulled to pass the second and first grooves 44 and 30. However, this option is less preferred, since it requires an additional air space for positioning the section of the wire, which increases the width of the air gap 25 between the assembly 58 of the magnets and wall 20 of the housing, thereby decreasing forces of the linear motor.

Figure 5:
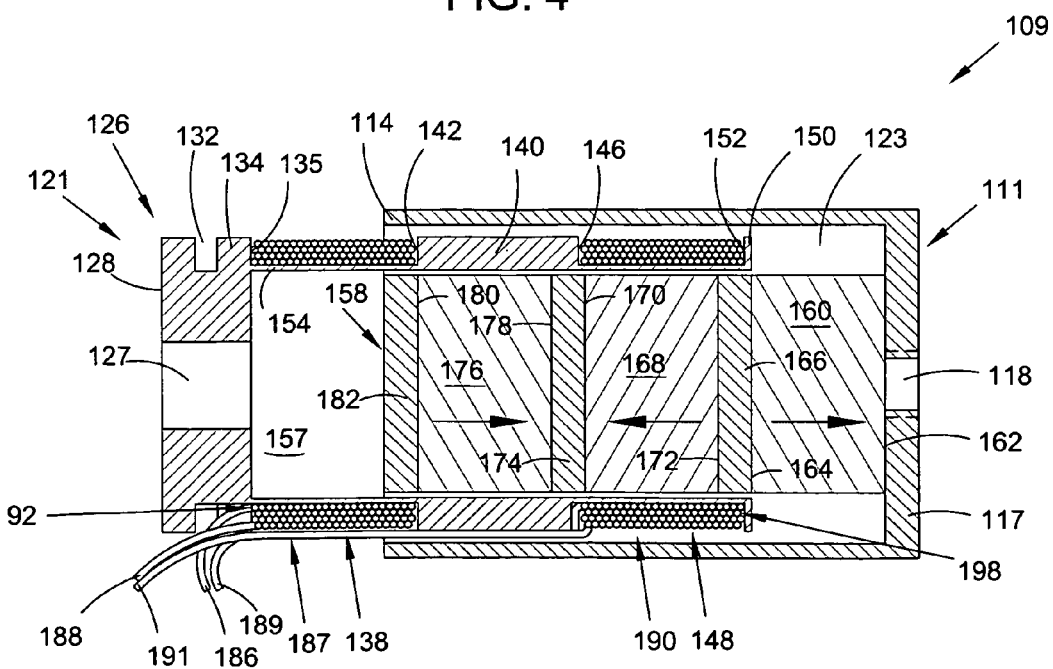
FIG. 5 is a longitudinal cross-sectional view of a linear motor from the second embodiment of the present invention, illustrating a movable coil carrier which is moved forwardly away from a housing of the motor along an axial direction of the motor.

It will be appreciated that from the above illustrated single coil having two sections of the coil windings, it reveals the spirit and scope of the present invention linear motor according to the first embodiment, wherein the single coil can have multiple sections of the coil windings wound in a same direction when applying a continuous wire. Accordingly, the coil carrier has the corresponding multiple winding areas. In addition, as compared with the single coil configuration illustrated in the first embodiment 10, the present invention linear motor has a second embodiment 109, which has a dual coil configuration, wherein two coils are wound in the same direction with the respective separated wires, as illustrated in FIG. 5.

Figure 4:
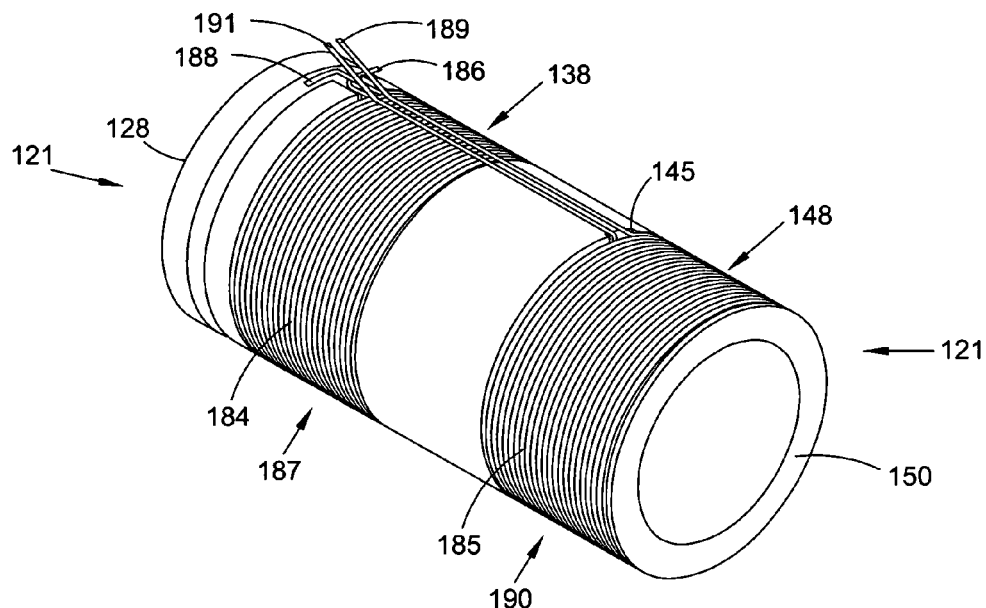
FIG. 4 is a perspective view of a coil carrier with two wound coils in the same winding direction from a second embodiment of the present invention.

The second embodiment 109 of the present invention linear motor includes first and second coils 187 and 190, which are wound in the same direction and by the respective separated wires 184 and 185, and are also illustrated in FIG. 4. Because of this structural configuration, it results in a coil carrier 121, circular air gap 123 between a housing 111 and magnet assembly 158, and two coils, which are different from those of the first embodiment 10.

A disclosure will not be repeated for structural features of the second embodiment 109, which are identical to those of the first embodiment. These structural features are designated with three-digit numerals.

Figure 6A:
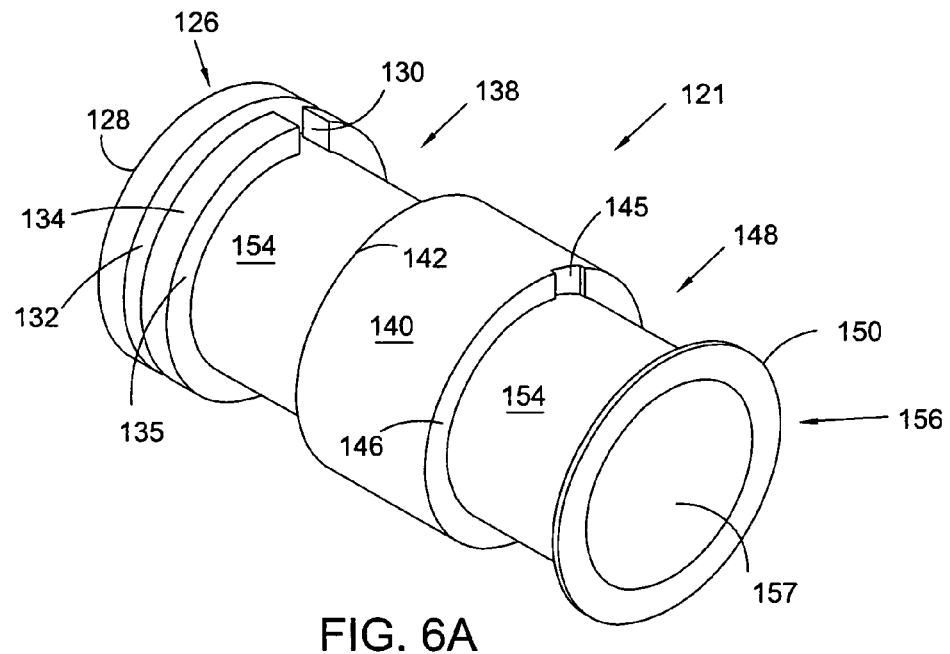
FIG. 6A is a perspective view of the coil carrier of the linear motor from the second embodiment of the present invention.
Figure 6B:
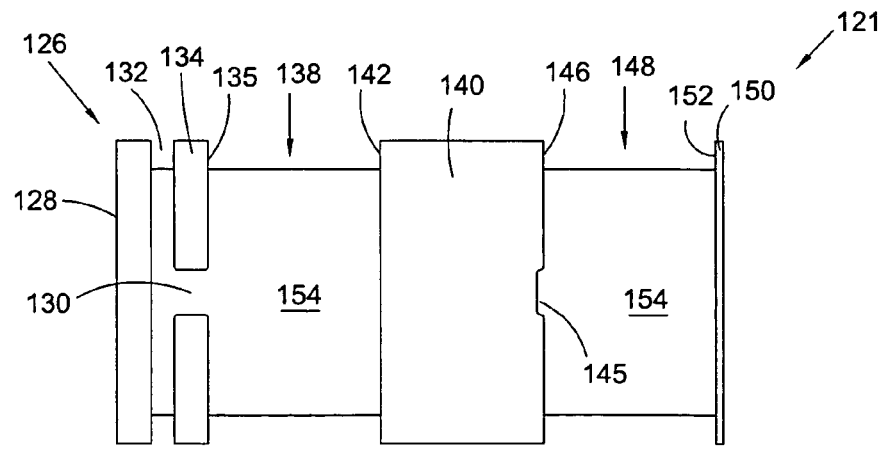
FIG. 6B is a front view of the coil carrier illustrated in FIG. 6A.

Referring to FIGS. 6A and 6B, there is illustrated coil carrier 121 of the second embodiment. It will be appreciated that, the difference of the coil carrier 121 is absence of the second groove 44 in the axial orientation, as compared with the coil carrier 24 of the first embodiment. Instead, there is a second notch 145 positioned on the second ring surface 146. Therefore, as illustrated in FIG. 4, the first coil 187 is wound in a first winding area 138 when applying the first wire 184 having a first end 186 and second end 188 in a similar fashion as disclosed for the first section 88 of the single coil in the first embodiment 10. The difference is that the first coil 187 is wound back and forth in the first wound area 138 in the same clockwise direction.

The second coil 190 is wound in a second wind area 148 when applying the second wire 185 having a first end 189 and second end 191 in a similar fashion as disclosed for the second section 91 of the single coil 22 in the first embodiment. The difference is that the second coil 190 is wound back and forth in the second winding area 148 in the same clockwise direction, in addition to first and second ends 189 and 191 of the wire connected to the corresponding sections of the wire 185 that must be positioned above an exterior layer of the first coil 187, after the first and second ends pass the second notch 145. In this setting, the second notch serves as a locking device to lock the corresponding sections of the wire 185 at positions where the wire is wound into the second winding area 148.

It will be appreciated that because of presence of the first and second ends of the second coil 190, there is a need for an additional room in the circular air gap 123 of the housing to position the two ends connected to the corresponding sections of the wire 185. For accommodating this requirement, a diameter of a distal end 117 of the housing 111 of the second embodiment is larger than that of the distal end 16 of the first embodiment. This results in an enlarged width of the air gap 123 of the second embodiment, as compared with a width of the air gap 25 of the first embodiment. It will be further appreciated that, as disclosed above, the enlarged width of the air gap cause forces of the linear motor in the second embodiment 109 to be less than those of the first embodiment 10.

It will be further appreciated that, from the above illustrated two coils wound in the same direction, either clockwise or counter-clockwise, with the respective separated wires, it reveals the spirit and scope of the present invention linear motor according to the second embodiment, which includes multiple coils wound in the same direction when applying the respective separated wires.

It will be additionally appreciated that, the linear motor of the present invention can have any symmetric shapes regarding its transverse cross section relative to the symmetric axis 99 although the cylindrical motor having a round cross section is disclosed above as the preferable embodiments.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The invention claimed is:

1. A linear motor, comprising:
a. a housing having an exterior wall to form an interior chamber, the housing having an open proximal end and a closed distal end, a movable, bobbin at least partially within the chamber and movable in a back and forth axial direction from the distal end of the housing to and through the open proximal end of the housing;
b. a distal axially magnetized permanent magnet located within and adjacent to distal end of the housing, the distal permanent magnet having a first magnetic pole and a second magnetic pole, the distal magnet coaxially connected at a location of its second magnetic pole to a first side of a distal pole piece made of ferromagnetic material;
c. a middle axially magnetized permanent magnet located within the housing and aligned with the distal magnet, the middle permanent magnet having a third magnetic pole and a fourth magnetic pole, the middle magnet coaxially affixed at a location of its third magnetic pole to a second side of the distal pole piece and affixed at a location of its fourth magnetic pole to a first side of a middle pole piece made of ferromagnetic material;
d. a proximal axially magnetized permanent magnet located within the housing and aligned with the middle magnet, the proximal permanent magnet having a fifth magnetic pole and a sixth magnetic pole, the proximal magnet affixed at a location of its fifth magnetic pole to a second side of the middle pole piece and affixed at a location of its sixth magnetic pole to a first side of a proximal pole piece made of ferromagnetic material;
e. the first and second poles of the distal permanent magnet determine the direction of magnetization of the distal permanent magnet, the fifth and sixth magnetic poles of the proximal permanent magnet determine the direction of magnetization of the proximal permanent magnet, and the distal and proximal permanent magnets have a same direction of magnetization, the third and fourth magnetic poles of the middle permanent magnet determine the direction of magnetization of the middle permanent magnet which is opposite to the direction of magnetization of the distal and proximal permanent magnets;
f. the distal permanent magnet affixed at a location of its first magnetic pole to an interior surface of the distal end of the housing and a second side of the proximal pole piece is aligned with the open proximal end of the housing, a circumferential air gap of a given radial width formed between an interior circumferential wall of the housing and an aligned magnet assembly of the distal, middle, and proximal magnets and distal, middle and proximal pole pieces;
g. the bobbin having a cylindrical wall with an exterior surface and an interior surface surrounding a hollow interior chamber, three spaced apart barriers formed on and extending radially above the exterior surface of the cylindrical wall including a proximal barrier with a longitudinal groove, a middle barrier with an aligned longitudinal groove and a distal barrier, a first winding area formed on the cylindrical wall of the bobbin between the proximal barrier and the middle barrier and a second winding area formed on the cylindrical wall of the bobbin between the middle barrier and the distal barrier;
h. a single electrical wire wound on the bobbin, the single electrical wire having a first end retained by the proximal barrier and extending through the longitudinal groove of the proximal barrier and wound around the first winding area of the cylindrical wall of the bobbin until it reaches the middle barrier, the electrical wire passing through the longitudinal groove in the middle barrier and wound around the second winding area of the cylindrical wall of the bobbin until the electrical wire reaches the distal barrier to complete a first winding layer, at least a second winding layer in the second winding area formed by winding the electrical wire in the same direction and going from the distal barrier to the middle barrier, passing through the groove in the middle barrier and wound within the first winding area in the same direction until it reaches the proximal barrier completing the second winding layer, a second end of the wire extends through the groove in the proximal barrier to rest adjacent the first end of the electrical wire;
i. the bobbin movably retained in the housing so that the hollow interior chamber of the bobbin surrounds the magnet assembly and barriers of the bobbin reside within the gap in the housing between the magnet assembly and the interior circumferential wall of the housing, the central barrier of the bobbin being of sufficient width so that when windings on the bobbin are entirely within the housing, the electrical wire wound on the first winding area and the electrical wire wound on the second winding area do not encircle the middle permanent magnet and when the bobbin is in its fully extended condition that is partially out of the housing, the electrical wire wound on the first winding area and the electrical wire wound on the second winding area do not encircle the proximal permanent magnet; and j. a source of electrical current connected to the wire interacts with a magnetic field created by the permanent magnet so that the bobbin moves axially relative to the housing so that the electrical wire of first and second winding areas are entirely within the housing in a first condition and the wire of the first winding area is out of the housing while the wire of the second winding area is in the housing in a second condition, use of a single wire reducing the radial width of the air gap between the bobbin and the interior circumferential wall of the housing so that an increased force is generated by the relative movement of the bobbin and the housing.

2. The linear motor in accordance with claim 1 wherein the bobbin is affixed to a stationary object and the housing moves relative to the bobbin when the source of electrical current is applied to the wire.

3. The linear motor in accordance with claim 1 wherein the housing is affixed to a stationary object and the bobbin moves relative to the housing.

4. The linear motor in accordance with claim 1 wherein the proximal barrier further comprises a transverse circular notch to retain the first and second end of the wire.

5. The linear motor in accordance with claim 1 further comprising a multiplicity of windings of the wire in the first winding area and the second winding area.

6. A linear motor, comprising:

a. a housing having an exterior wall to form an interior chamber, the housing having an open proximal end and a closed distal end, a movable bobbin at least partially within the interior chamber and movable in a back and forth axial direction from the distal end of the housing to and through the open proximal end of the housing;

b. a magnet assembly comprising a distal magnet, a middle magnet, and a proximal magnet, a distal pole piece between the distal magnet and the middle magnet, a middle pole piece between the middle magnet and the proximal magnet, a proximal pole piece located adjacent to the proximal magnet at a location not touching the middle pole piece, the distal magnet affixed to an interior surface of the distal end of the housing so that the magnet assembly is retained within the interior chamber of the housing with a circumferential air gap of a given radial width between the interior circumferential surface of the housing and the magnet assembly, a direction of magnetization of the distal and proximal magnets being the same and the direction of the magnetization of the middle magnet being opposite to the direction of magnetization of the distal and proximal magnets;

c. the bobbin having a cylindrical wall with an exterior surface and an interior surface surrounding a hollow interior chamber, three spaced apart barriers formed on and extending radially above the exterior surface of the cylindrical wall including a proximal barrier with a longitudinal groove, a middle barrier with an aligned longitudinal groove and a distal barrier, a first winding area formed on the cylindrical wall of the bobbin between the proximal barrier and the middle barrier and a second winding area formed on the cylindrical wall of the bobbin between the middle barrier and the distal barrier;

d. a single electrical wire wound on the bobbin, the single electrical wire having a first end retained by the proximal barrier and extending through the longitudinal groove of the proximal barrier and wound around the first winding area of the cylindrical wall of the bobbin until the wire reaches the middle barrier, the electrical wire passing through the longitudinal groove in the middle barrier and wound around the second winding area of the cylindrical wall of the bobbin until the electrical wire reaches the distal barrier to complete a first winding layer, at least a second winding layer formed by winding the electrical wire in the same direction and going from the distal barrier to the middle barrier, passing through the groove in the middle barrier and wound in the same direction until it reaches the proximal barrier to complete the second winding layer, a second end of the wire extends through the groove in the proximal barrier to rest adjacent the first end of the electrical wire;

e. the bobbin movably retained in the housing so that the hollow interior chamber of the bobbin surrounds the magnet assembly and barriers of the bobbin reside within the gap in the housing between the magnet assembly and the interior circumferential wall of the housing, the central barrier of the bobbin being of sufficient width so that when windings on the bobbin are entirely within the housing, the electrical wire wound on the first winding area and the electrical wire wound on the second winding area do not encircle the middle permanent magnet and when the bobbin is in its fully extended condition partially out of the housing, the electrical wire wound on the first winding area and the electrical wire wound on the second winding area do not encircle the proximal permanent magnet; and f. a source of electrical current connected to the wire interacts with a magnetic field created by the permanent magnets so that the bobbin moves axially relative to the housing so that the wire in the first and second winding areas are entirely within the housing in a first condition and the electrical wire of the first winding area is out of the housing while the electrical wire of the second winding area is in the housing in a second condition, use of a single wire reducing the radial width air gap between the bobbin and the interior circumferential wall of the housing so that an increased force is generated by the relative movement of the bobbin and the housing.

7. The linear motor in accordance with claim 6 wherein the distal magnet, middle magnet and proximal magnet are each permanent magnets.

8. The linear motor in accordance with claim 6 wherein the distal pole piece, middle pole piece and proximal pole piece are each made of ferromagnetic material.

9. The linear motor in accordance with claim 6 wherein the bobbin is affixed to a stationary object and the housing moves relative to the bobbin when the source of electrical current is applied to the wire.

10. The linear motor in accordance with claim 6 wherein the housing is affixed to a stationary object and the bobbin moves relative to the housing.

11. The linear motor in accordance with claim 6 wherein the proximal barrier further comprises a transverse circular notch to retain the first and second end of the wire.

12. The linear motor in accordance with claim 6 further comprising a multiplicity of windings of the wire in the first winding area and the second winding area.

13. A linear motor, comprising:
a. a housing having an exterior wall to form an interior chamber, the housing having an open proximal end and a closed distal end, a movable bobbin at least partially within the chamber and movable in a back and forth axial direction from the distal end of the housing to and through the open proximal end of the housing;
b. a distal axially magnetized permanent magnet located within and adjacent to the distal end of the housing, the distal permanent magnet having a first magnetic pole and a second magnetic pole, the distal magnet coaxially connected at a location of its second magnetic pole to a first side of a distal pole piece made of ferromagnetic material;
c. a middle axially magnetized permanent magnet located within the housing and aligned with the distal magnet, the middle permanent magnet having a third magnetic pole and a fourth magnetic pole, the middle magnet coaxially affixed at a location of its third magnetic pole to a second side of the distal pole piece and affixed at a location of its fourth magnetic pole to a first side of a middle pole piece made of ferromagnetic material;
d. a proximal axially magnetized permanent magnet located within the housing and aligned with the middle magnet, the proximal permanent magnet having a fifth magnetic pole and a sixth magnetic pole, the proximal magnet affixed at a location of its fifth magnetic pole to a second side of the middle pole piece and affixed at a location of its sixth magnetic pole to a first side of a proximal pole piece made of ferromagnetic material;
e. the first and second poles of the distal permanent magnet determine the direction of magnetization of the distal permanent magnet, the fifth and sixth magnetic poles of the proximal permanent magnet determine the direction of magnetization of the proximal permanent magnet, and the distal and proximal permanent magnets have a same direction of magnetization, the third and fourth magnetic poles of the middle permanent magnet determine the direction of magnetization of the middle permanent magnet which is opposite to the direction of magnetization of the distal and proximal permanent magnets;
f. the distal permanent magnet affixed at a location of its first magnetic pole to an interior surface of the distal end of the housing and a second side of the proximal pole piece is aligned with the open proximal end of the housing, a circumferential gap formed between an interior circumferential wall of the housing and an aligned magnet assembly of the distal, middle, and proximal magnets and distal, middle and proximal pole pieces;
g. the bobbin having a cylindrical wall with an exterior surface and an interior surface surrounding a hollow interior chamber, three spaced apart barriers formed on and extending radially above the exterior surface of the cylindrical wall including a proximal barrier with a longitudinal groove, a middle barrier with a notch and a distal barrier, a first winding area formed on the cylindrical wall of the bobbin between the proximal barrier and the middle barrier and a second winding area formed on the cylindrical wall of the bobbin between the middle barrier and the distal barrier;
h. a first electrical wire wound on the bobbin, the first electrical wire having a first end retained by the proximal barrier and extending through the longitudinal groove of the proximal barrier and wound around the first winding area of the cylindrical wall of the bobbin cylindrical wall until it reaches the middle barrier, the first electrical wire wound in the same direction but wound from the middle barrier to the proximal barrier,
i. a second end of the first electrical wire extends out of the groove in the proximal barrier;
i. a second electrical wire wound on the bobbin, the second electrical wire having a first end retained by the proximal barrier and extending over the windings of the first wire and retained in the notch of the middle barrier
and wound around the second winding area of the cylindrical wall of the bobbin until the electrical wire reaches the distal barrier, and then extending over the first electrical wire with a second end extending through the groove in the proximal barrier to rest adjacent the first end of the second electrical wire;
j. the bobbin movably retained in the housing so that the hollow interior chamber of the bobbin surrounds the magnet assembly and barriers of the bobbin reside within the gap in the housing between the magnet assembly and the interior circumferential wall of the housing, the central barrier of the bobbin being of sufficient width so that when windings on the bobbin are entirely within the housing, the first electrical wire wound on the first winding area and the second electrical wire wound on the second winding area do not encircle the middle permanent magnet and when the bobbin is in its fully extended condition that is partially out of the housing, the first electrical wire wound on the first winding area and the second electrical wire wound on the second winding area do not encircle the proximal permanent magnet; and
k. a source of electrical current connected to the first and second wires interacts with the magnetic field created by the permanent magnets, thereby moving the bobbin axially relative to the housing so that the first and second windings are entirely within the housing in a first condition and the first winding is out of the housing while the second winding is in the housing in a second condition.

14. The linear motor in accordance with claim 13 wherein the bobbin is affixed to a stationary object and the housing moves relative to the bobbin when the source of electrical current is applied to the wire.

15. The linear motor in accordance with claim 13 wherein the housing is affixed to a stationary object and the bobbin moves relative to the housing.

16. The linear motor in accordance with claim 13 wherein the proximal barrier further comprises a transverse circular notch to retain the first and second end of the wire.

17. The linear motor in accordance with claim 13 further comprising a multiplicity of windings of the wire in the first winding area and the second winding area.

18. A linear motor, comprising:
a. a housing having an exterior wall to form an interior chamber, the housing having an open proximal end and a closed distal end, a movable bobbin at least partially within the interior chamber and movable in a back and forth axial direction from the distal end of the housing to and through the open proximal end of the housing;
b. a magnet assembly comprising a distal magnet, a middle magnet, and a proximal magnet, a distal pole piece between the distal magnet and the middle magnet, a middle pole piece between the middle magnet and the proximal magnet, a proximal pale piece located adjacent to the proximal magnet at a location not touching the middle pole piece, the distal magnet affixed to an interior surface of the distal end of the housing so that the magnet assembly is retained within the interior chamber of the housing with a circumferential air gap of a given radial width between the interior circumferential wall of the housing and the magnet assembly, a direction of magnetization of the distal and proximal magnets being the same and the direction of magnetization of the middle magnet being opposite to the direction of magnetization of the distal and proximal magnets;

c. the bobbin having a cylindrical wall with an exterior surface and an interior surface surrounding a hollow interior chamber, three spaced apart barriers formed on and extending radially above the exterior surface of the cylindrical wall including a proximal barrier with a longitudinal groove, a middle bather with a notch and a distal barrier, a first winding area formed on the bobbin cylindrical wall between the proximal barrier and the middle barrier and a second winding area formed on the bobbin cylindrical wall between the middle barrier and the distal barrier;

d. a first electrical wire wound on the bobbin, the first electrical wire having a first end retained by the proximal barrier and extending through the longitudinal groove of the proximal barrier and wound around the first winding area of the cylindrical wall of the bobbin until it reaches the middle barrier, to form a first winding layer, the first electrical wire continuously wound in the same direction but wound from the middle barrier to the proximal barrier to form a second layer, a second end extends out of the groove in the proximal barrier;

e. a second electrical wire wound on the bobbin, the second electrical wire having a first end retained by the proximal barrier and extending over the windings of the first wire and retained in the notch of the middle barrier and wound around the second winding area of the cylindrical wall of the bobbin until the electrical wire reaches the distal barrier and then wound in the same direction but going from the distal barrier to the middle barrier, and then extending over the first electrical wire with a second end extending through the groove in the proximal barrier to rest adjacent to the first end of the second electrical wire;

f. the bobbin movably retained in the housing so that the hollow interior chamber of the bobbin surrounds the magnet assembly and the exterior wall and barriers of the bobbin reside within the gap in the housing between the magnet assembly and the interior wall of the housing, the central barrier of the bobbin being of sufficient width so that when windings on the bobbin are entirely within the housing, the first electrical wire wound on the first winding area and the second electrical wire wound on the second winding area do not encircle the middle permanent magnet and when the bobbin is in its fully extended condition which is partially out of the housing, the first electrical wire wound on the first winding area and the second electrical wire wound on the second winding area do not encircle the proximal and distal permanent magnets; and g. a source of electrical current connected to the first and second wires interacts with the magnetic fields created by the magnet assembly, thereby moving the bobbin axially relative to the housing so that the first and second windings are entirely within the housing in a first condition and the first winding is out of the housing while the second winding is in the housing in a second condition.

19. The linear motor in accordance with claim 18 wherein the distal magnet, middle magnet and proximal magnet are each permanent magnets.

20. The linear motor in accordance with claim 18 wherein the distal pole piece, middle pole piece and proximal pole piece are each made of ferromagnetic material.

21. The linear motor in accordance with claim 18 wherein the bobbin is affixed to an object and the housing moves relative to the bobbin when the source of electrical current is applied to the wire.

22. The linear motor in accordance with claim 18 wherein the housing is affixed to an object and the bobbin moves relative to the housing.

23. The linear motor in accordance with claim 18 wherein the proximal barrier further comprises a transverse circular notch to retain the first and second end of the wire.

24. The linear motor in accordance with claim 18 further comprising a multiplicity of windings of the wire in the first winding area and the second winding area.

* * * * *